United States Patent
Chung et al.

(10) Patent No.: US 12,537,619 B2
(45) Date of Patent: Jan. 27, 2026

(54) APPARATUS AND METHOD FOR WIRELESS COMMUNICATION BASED ON PUNCTURING

(71) Applicant: SAMSUNG ELECTRONICS CO., LTD., Suwon-si (KR)

(72) Inventors: Chulho Chung, Yongin-si (KR); Jonghun Han, Gwacheon-si (KR); Myeongjin Kim, Seongnam-si (KR); Eunsung Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 523 days.

(21) Appl. No.: 17/991,171

(22) Filed: Nov. 21, 2022

(65) Prior Publication Data

US 2023/0179325 A1  Jun. 8, 2023

(30) Foreign Application Priority Data

Dec. 3, 2021 (KR) ........................ 10-2021-0172265

(51) Int. Cl.
*H04L 1/00* (2006.01)
*H04W 74/08* (2024.01)
*H04W 74/0816* (2024.01)

(52) U.S. Cl.
CPC ....... *H04L 1/0013* (2013.01); *H04W 74/0816* (2013.01)

(58) Field of Classification Search
CPC ......... H04W 74/0816; H04W 74/0825; H04W 74/0808; H04L 1/0013; H04L 1/001; H04L 1/0011
See application file for complete search history.

(56) References Cited

U.S. PATENT DOCUMENTS

| | | | |
|---|---|---|---|
| 10,772,099 B2 | 9/2020 | Verma et al. | |
| 10,827,385 B2 | 11/2020 | Verma et al. | |
| 10,939,476 B1* | 3/2021 | Chu ..................... | H04W 76/15 |
| 10,966,200 B2 | 3/2021 | Chu et al. | |
| 11,057,174 B2 | 7/2021 | Verma et al. | |
| 11,057,880 B2 | 7/2021 | Verma et al. | |

(Continued)

FOREIGN PATENT DOCUMENTS

JP   2021-78010 A   5/2021

OTHER PUBLICATIONS

"Draft Standard for Information technology—Telecommunications and information exchange between systems Local and metropolitan area networks—Specific requirements", Part 11: Wireless LAN Medium Access Control (MAC) and Physical Layer (PHY) Specifications, IEEE P802 11 TM/D1.3, Working Group of the LAN/MAN Standards Committee of the IEEE Computer Society, vol. 802.11, No. 1.3, Nov. 17, 2021, pp. 1-819, XP068192094.

(Continued)

*Primary Examiner* — Phong La
(74) *Attorney, Agent, or Firm* — Sughrue Mion, PLLC

(57) ABSTRACT

A wireless communication method by a first device includes determining one or more sub-channels to be punctured within a bandwidth, generating a first field based on the one or more sub-channels, generating a media access control (MAC) frame including the first field, and transmitting a first physical layer protocol data unit (PPDU) punctured in the at least one sub-channel within the bandwidth, to a second device.

16 Claims, 25 Drawing Sheets

| UL/DL | PPDU Type and Compression Mode | | Punctured Channel Info |
|---|---|---|---|
| U-SIG-1 B6 | U-SIG-1 B0-B1 | Note | U-SIG-2 B3-B7 |
| 0 (DL) | 0 | DL OFDMA | Puncturing pattern of the relevant 80MH with B3-B7 |
| | 2 | Non-OFDMA DL MU-MIMO | Non-OFDMA puncturing pattern of entire BW |
| | 3 | -- | -- |
| Any | 1 | SU transmission or EHT sounding NDP | -- |
| 1 (UL) | 0 | TB PPDU | -- |
| | 2 | -- | -- |
| | 3 | -- | -- |

(56) References Cited

U.S. PATENT DOCUMENTS

| | | | |
|---|---|---|---|
| 2019/0181979 A1* | 6/2019 | Wang | H04L 1/0068 |
| 2019/0349930 A1* | 11/2019 | Chu | H04W 72/0453 |
| 2019/0380117 A1* | 12/2019 | Verma | H04L 5/0007 |
| 2020/0288439 A1 | 9/2020 | Seok et al. | |
| 2021/0160959 A1* | 5/2021 | Cao | H04L 5/0044 |
| 2021/0168864 A1 | 6/2021 | Seok et al. | |
| 2021/0320831 A1* | 10/2021 | Park | H04W 72/0453 |
| 2022/0085910 A1* | 3/2022 | Sun | H04L 5/001 |
| 2022/0150025 A1* | 5/2022 | Tian | H04W 72/20 |
| 2023/0179325 A1* | 6/2023 | Chung | H04L 5/0094 |
| | | | 370/310 |
| 2023/0319884 A1* | 10/2023 | Ko | H04W 74/002 |
| | | | 370/329 |
| 2024/0090034 A1* | 3/2024 | Kim | H04W 72/0457 |
| 2024/0292262 A1* | 8/2024 | Kim | H04W 24/08 |
| 2024/0292463 A1* | 8/2024 | Kim | H04W 74/006 |
| 2024/0306199 A1* | 9/2024 | Lim | H04W 74/0808 |
| 2024/0418821 A1* | 12/2024 | Jang | H04W 74/00 |
| 2025/0024490 A1* | 1/2025 | Jang | H04W 74/06 |
| 2025/0088243 A1* | 3/2025 | Lim | H04L 5/0041 |

OTHER PUBLICATIONS

Matthew Fischer et al., "Disallowed Sub Channels", doc. IEEE 802.11-18-18/0496r13, Wireless LANs, vol. 802.11 ax, No. 13, Sep. 2018, pp. 1-18, XP068127879.

"Draft Standard for Information technology—Telecommunications and information exchange between systems Local and metropolitan area networks—Specific requirements", Part 11: Wireless LAN Medium Access Control (MAC) and Physical Layer (PHY) Specifications, IEEE P802.11be/D1.3, vol. 802.11, Mar. 19, 2021, pp. 1-605, XP068192110.

Yanjun Sun et al., "Resolution for Miscellaneous CIDs related to Clause 25.2.1.2 (CC34)", doc.: IEEE 802.11-21/0455r2, Wireless LANs, vol. 802.11 EHT, No. 2, Apr. 18, 2021, pp. 1-10, XP068179793.

Communication issued May 8, 2023 by the European Patent Office in European Patent Application No. 22208075.6.

* cited by examiner

FIG. 6

| UL/DL | PPDU Type and Compression Mode | | Punchured Channel Info |
|---|---|---|---|
| U-SIG-1 B6 | U-SIG-1 B0~B1 | Note | U-SIG-2 B3~B7 |
| 0 (DL) | 0 | DL OFDMA | Puncturing pattern of the relevant 80MH with B3~B7 |
| | 2 | Non-OFDMA DL MU-MIMO | Non-OFDMA puncturing pattern of entire BW |
| | 3 | - | - |
| Any | 1 | SU transmission or EHT sounding NDP | - |
| 1 (UL) | 0 | TB PPDU | - |
| | 2 | - | - |
| | 3 | - | - |

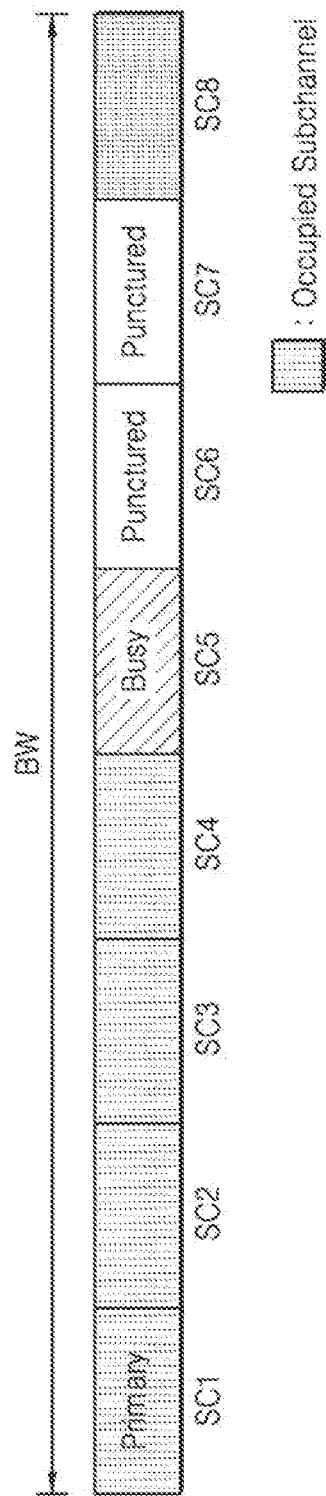

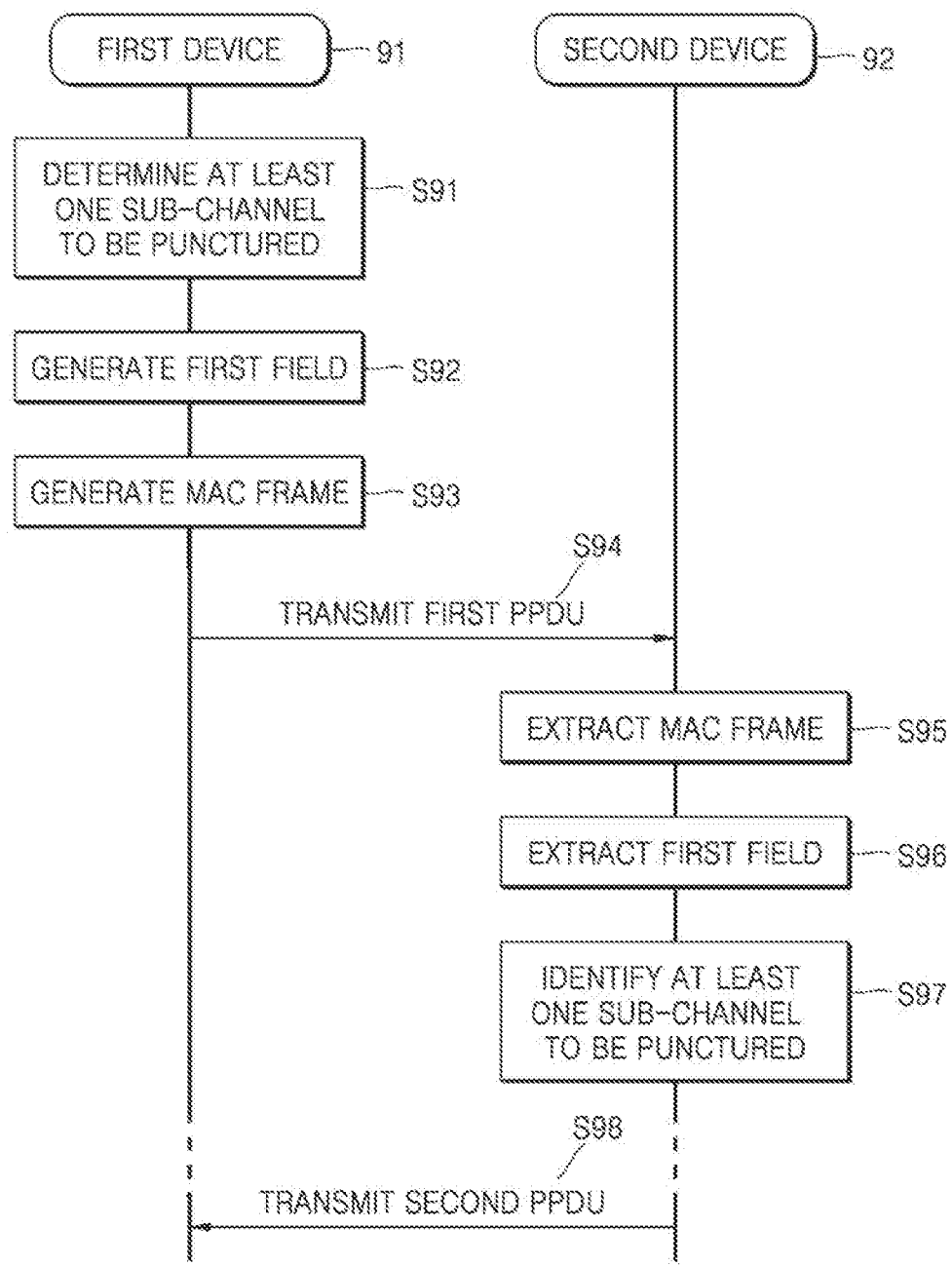

FIG. 14

| Condition | Scrambler Initialization | | | | | | R | Remaining SERVICE Bits | | | | | | | |
|---|---|---|---|---|---|---|---|---|---|---|---|---|---|---|---|
| A | "0" | "0" | "0" | "0" | "0" | "0" | R | R | R | R | R | R | R | R | R |
| B | | | | | | | If TX: Bit 2 of CBINH If RX: Bit 2 of CBINHI | | | | | | | | |
| | B0 | B1 | B2 | B3 | B4 | B5 | B6 | B7 | B8 | B9 | B10 | B11 | B12 | B13 | B14 | B15 |

Transmit Order →

| TXVECTOR | CH_BANDWIDTH_IN_NOT_HT |
|---|---|
| RXVECTOR | CH_BANDWIDTH_IN_NON_HT_INDICATOR |

FIG. 15A

| Condition | SERVICE Bits | | | | | | | | | | |
|---|---|---|---|---|---|---|---|---|---|---|---|
| | B5 | B6 | B7 | B8 | B9 | B10 | B11 | B12 | B13 | B14 | B15 |
| BW=320 | B5 | B6 | | B8 | B9 | B10 | | | | | |
| Others | | | | B8 | B9 | B10 | B11 | | | | |

Transmit Order ⟶           ▨ : F2 Bits

FIG. 15B

| Condition | SERVICE Bits | | | | | | | | | | |
|---|---|---|---|---|---|---|---|---|---|---|---|
| | B5 | B6 | B7 | B8 | B9 | B10 | B11 | B12 | B13 | B14 | B15 |
| Non-OFDM | B5 | B6 | | B8 | B9 | B10 | B11 | B12 | | | |
| OFDMA | | | | B8 | B9 | B10 | B11 | B12 | | | |

Transmit Order ⟶      ▧ : F2 Bits

FIG. 16A

| Parameter | TXVECTOR | RXVECTOR |
|---|---|---|
| INACTIVE_SUBCHANNELS | Y | Y |

FIG. 16B

| Parameter | TXVECTOR | RXVECTOR |
|---|---|---|
| RU_ALLOCATION | Y | Y |

FIG. 16C

| Parameter | TXVECTOR | RXVECTOR |
|---|---|---|
| PUNCTURED_CHANNEL | N | Y |

APPARATUS AND METHOD FOR WIRELESS COMMUNICATION BASED ON PUNCTURING

CROSS-REFERENCE TO RELATED APPLICATION

This application is based on and claims priority under 35 U.S.C. § 119 to Korean Patent Application No. 10-2021-0172265, filed on Dec. 3, 2021, in the Korean Intellectual Property Office, the disclosure of which is incorporated by reference herein in its entirety.

BACKGROUND

The present disclosure relates to wireless communication, and more particularly, to an apparatus and a method for wireless communication based on puncturing.

As an example of wireless communication, a wireless local area network (WLAN) is a technology for interconnecting two or more devices using a wireless signal transmission scheme. The WLAN may be based on the Institute of Electrical and Electronics Engineers (IEEE) 802.11 standard. The 802.11 standard has been developed according to standards like 802.11b, 802.11a, 802.11g, 802.11n, 802.11ac, and 802.11ax and may support transmission speeds up to 1 Gbyte/s based on the orthogonal frequency-division multiplexing (OFDM) technique.

In the 802.11ac standard, data may be simultaneously transmitted to a plurality of users by using a multi-user multi-input multi-output (MU-MIMO) scheme. In the 802.11ax standard that is also referred to as high efficiency (HE) standard, multiple access is implemented by dividing and providing available subcarriers to users by applying the orthogonal frequency-division multiple access (OFDMA) scheme as well as the MU-MIMO scheme. Therefore, a WLAN system based on the 802.11ax standard may effectively support communication in a densely-populated area and in the outdoors.

In the 802.11be standard that is also referred to as extremely high throughput (EHT) standard, there are attempts to implement 6 GHz unlicensed frequency band support, to utilize a maximum 320 MHz per channel, to introduce hybrid automatic repeat and request (HARQ), and to maximize 16×16 MIMO support. Therefore, a next-generation WLAN system is expected to effectively support a low latency and ultra high-speed transmission like a new radio (NR), which is a 5G technology.

SUMMARY

It is an aspect to provide an apparatus and a method capable of providing a higher throughput in wireless communication based on puncturing.

According to an aspect of an embodiment, there is provided a wireless communication method comprising determining, by a first device, at least one sub-channel to be punctured within a bandwidth; generating, by the first device, a first field based on the at least one sub-channel; generating, by the first device, a media access control (MAC) frame comprising the first field; and transmitting, by the first device, a first physical layer protocol data unit (PPDU) punctured in the at least one sub-channel within the bandwidth, to a second device.

According to another aspect of an embodiment, there is provided a wireless communication method comprising receiving, by a second device, a first physical layer protocol data unit (PPDU) punctured in at least one sub-channel within a bandwidth, from a first device; extracting, by the second device, a media access control (MAC) frame from the first PPDU; extracting, by the second device, a first field from the MAC frame; and identifying, by the second device, the at least one sub-channel within the bandwidth, based on the first field.

According to another aspect of an embodiment, there is provided a wireless communication method comprising determining, by a first device, at least one sub-channel to be punctured within a bandwidth; generating, by the first device, a first field based on the at least one sub-channel; and transmitting, by the first device, a non-high throughput (HT) duplicate physical layer protocol data unit (PPDU) comprising the first field and punctured in the at least one sub-channel within the bandwidth, to a second device, wherein the first field is included in a service field and comprises at least one bit from among upper 8-bits of the service field.

According to another aspect of an embodiment, there is provided a wireless communication method comprising receiving, by a second device, a first physical layer protocol data unit (PPDU) punctured in at least one sub-channel within a bandwidth, from a first device; extracting, by the second device in a physical (PHY) layer, a first field from the first PPDU and providing a first parameter of a RXVECTOR to a media access control (MAC) layer of the second device, based on the first field; and identifying, by the second device in the MAC layer, the at least one sub-channel within the bandwidth, based on a value of the first parameter.

BRIEF DESCRIPTION OF THE DRAWINGS

Various embodiments will be more clearly understood from the following detailed description taken in conjunction with the accompanying drawings, in which:

FIG. 6 is a diagram showing a punctured channel information field according to an embodiment;

FIGS. 7A and 7B are diagrams showing examples of puncturing according to embodiments;

FIG. 9 is a message diagram showing a wireless communication method based on puncturing according to an embodiment;

FIG. 14 is a diagram showing a service field according to an embodiment;

FIGS. 15A to 15D are diagrams showing examples of a second field according to embodiments;

FIGS. 16A to 16C are diagrams showing examples of parameters according to embodiments.

DETAILED DESCRIPTION

Figure 1:
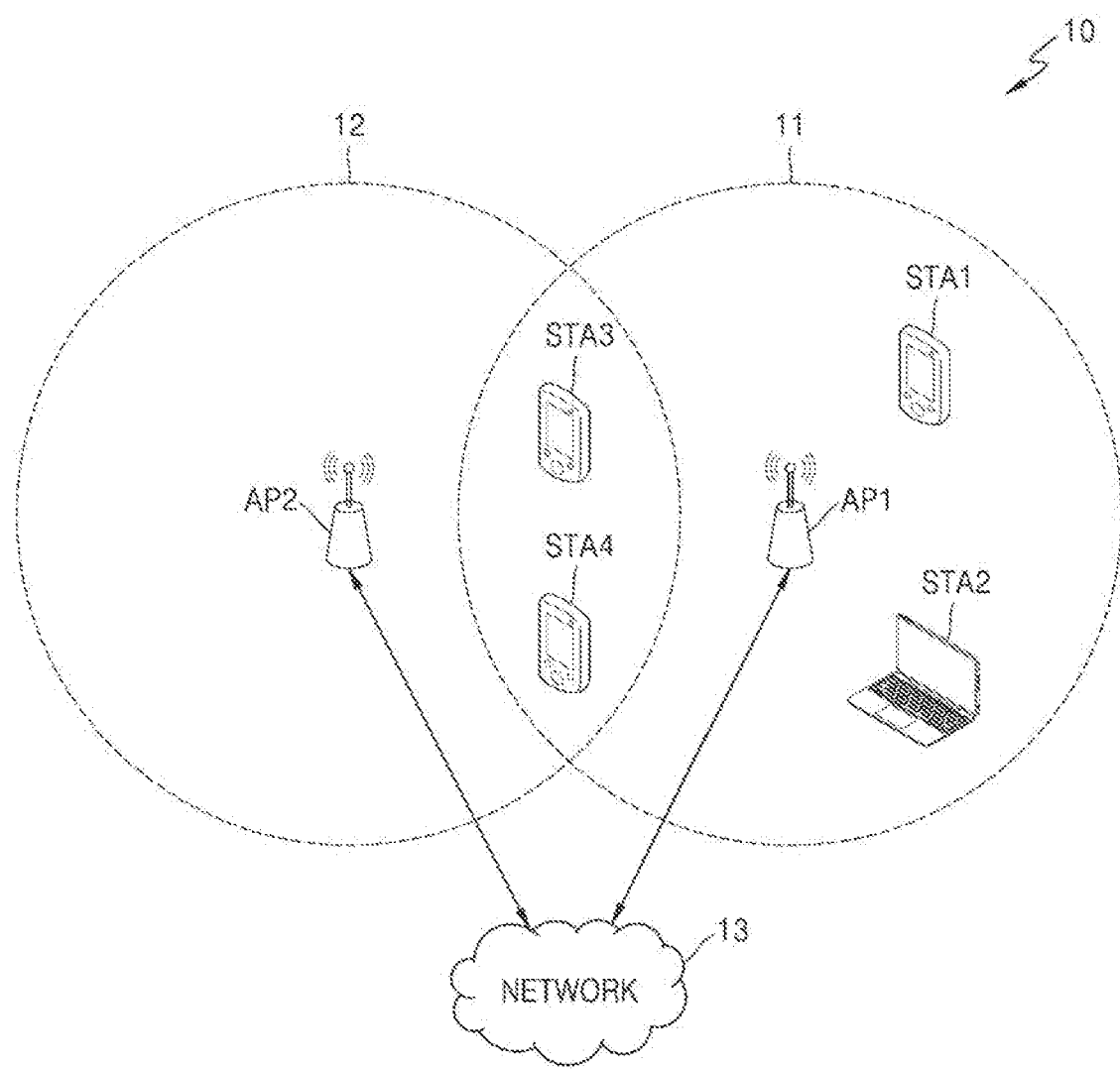
FIG. 1 is a diagram showing a wireless communication system according to an embodiment.

FIG. 1 is a diagram showing a wireless communication system 10 according to an embodiment. In detail, FIG. 1 shows a wireless local area network (WLAN) system as an example of the wireless communication system 10.

Various embodiments will be described in detail mainly based on an orthogonal frequency-division multiplexing (OFDM)-based or orthogonal frequency-division multiple access (OFDMA)-based wireless communication system (particularly, the IEEE 802.11 standard). However, the technical concepts of the present disclosure may also be applied to any other communication systems having a similar technical background and a channel structure, e.g., a cellular communication system like long term evolution (LTE), LTE-advance (LTE-A), new radio (NR), wireless broadband (WiBro), and global system for mobile communication (GSM) or a short-distance communication system like Bluetooth and near field communication (NFC) with modifications within a range not significantly deviating from the scope of the technical concepts, based on a decision of one of ordinary skill in the art.

Also, various functions described below may be implemented or supported by artificial intelligence technology or one or more computer programs, each of which is composed of computer readable program codes and implemented on a computer readable medium. The terms "application" and "program" refer to one or more computer programs, software components, instruction sets, procedures, functions, objects, classes, instances, related data, or portions thereof suitable for the implementation of suitable computer readable program codes. The term "computer readable program codes" includes all types of computer codes including source codes, object codes, and executable codes. The term "computer readable medium" includes all types of media that may be accessed by computers, such as a read only memory (ROM), a random access memory (RAM), a hard disk drive, a compact disk (CD), a digital video disk (DVD), or other types of memories. A "non-transitory" computer readable medium excludes wired, wireless, optical, or other types of communication links that transmit transitory electrical or other signals. The non-transitory computer readable medium includes a medium in which data may be permanently stored and a medium in which data may be stored and later overwritten, such as a rewritable optical disk or an erasable memory device.

In various embodiments described below, a hardware approach is described as an example. However, since various embodiments include technology using both hardware and software, the various embodiments do not exclude a software-based approach.

Also, terms that refer to control information, terms that refer to entries, terms that refer to network entities, terms that refer to messages, and terms that refer to components of devices used in the descriptions given below are merely examples for convenience of explanation. Therefore, the technical concepts are not limited to the terms described below, and other terms having equivalent technical meanings may be used.

Referring again to FIG. 1, the wireless communication system 10 may include a first access point AP1, a second access point AP2, a first station STA1, a second station STA2, a third station STA3, and a fourth station STA4. The first access point AP1 and the second access point AP2 may access a network 13 including, for example, the Internet, an Internet protocol (IP) network, or any other network. The first access point AP1 may provide access to the network 13 within a first coverage region 11 to the first station STA1, the second station STA2, the third station STA3, and the fourth station STA4, and the second access point AP2 may also provide access to the network 13 within a second coverage region 12 to the third station STA3 and the fourth station STA4 in the example illustrated in FIG. 1. In some embodiments, the first access point AP1 and the second access point AP2 may communicate with at least one of the first station STA1, the second station STA2, the first access point AP1, the second access point AP2, the third station STA3, and the fourth station STA4 based on the wireless fidelity (WiFi) or any other WLAN access technology. In other words, the components illustrated in FIG. 1 may communicate with one another based on the wireless fidelity (WiFi) or any other WLAN access technology.

An access point may be referred to as a router or a gateway, and a station may be referred to as a mobile station, a subscriber station, a terminal, a mobile terminal, a wireless terminal, a user equipment, or a user. A station may be a portable device like a mobile phone, a laptop computer, or a wearable device or may be a stationary device like a desktop computer or a smart TV. In some embodiments, an access point (e.g., AP1) and a station (e.g., STA1) may be collectively referred to as a station, and a station (e.g., STA1) that is not an access point (e.g., AP1) may be referred to as a non-access point station (non-AP STA). Herein, unless stated otherwise, a station may refer to a non-AP STA. Examples of access points and stations will be described later with reference to FIG. 17.

An access point may allocate at least one resource unit (RU) to at least one station. The access point may transmit data through at least one allocated RU, and the at least one station may receive data through the at least one allocated RU. In 802.11ax (hereinafter referred to as HE), an access point may allocate only a single RU to at least one station. That is, in 802.11ax, the access point may allocate only a single RU per station. However, in 802.11be (hereinafter referred to as EHT) or next-generation IEEE 802.11 standards (hereinafter referred to as EHT+), the access point may allocate a multiple resource unit (MRU) including two or more RUs to the at least one station. That is, in 802.11be, the access point may allocate multiple RUs per station. For example, the first access point AP1 may allocate a MRU to at least one of the first station STA1, the second station STA2, the third station STA3, and the fourth station STA4 and may transmit data through the allocated MRU.

In some embodiments, an access point and a station may communicate based on puncturing (or preamble puncturing). For example, as described later with reference to FIG. 3, an access point and a station may not use at least one of sub-channels included in a bandwidth and may transmit or receive a signal in which at least one sub-channel is punctured (i.e., not used/excluded). Accordingly, a sub-channel that may cause interference may be excluded, communication through a punctured sub-channel may be efficiently performed, and interference may not occur in other communication. An access point and a station related to each other may share information regarding a punctured sub-channel by determining in advance a sub-channel to be punctured. However, as shown in FIG. 1, when a plurality of access points and/or stations communicate with each other, a sub-channel on which the interference occurs may vary.

As described below with reference to the drawings, a transmitting side (e.g., an access point or a station) and a receiving side (e.g., a station or an access point) may dynamically determine at least one sub-channel to be punctured according to a situation and perform signaling for sharing information regarding the determined at least one sub-channel, that is, puncturing information. Therefore, puncturing information may be easily shared, and the effect of puncturing may be increased. Also, due to signaling of puncturing information, puncturing may be adaptively used according to an environment, and an optimal throughput and efficiency may be achieved in a given environment. As a result, the efficiency of the wireless communication system 10 may be improved. Hereinafter, various embodiments will be mainly described with reference to the EHT. However, it will be understood that embodiments may also be applied to other protocol standards like next-generation IEEE 802.11 standards (i.e., EHT+).

Figure 2:
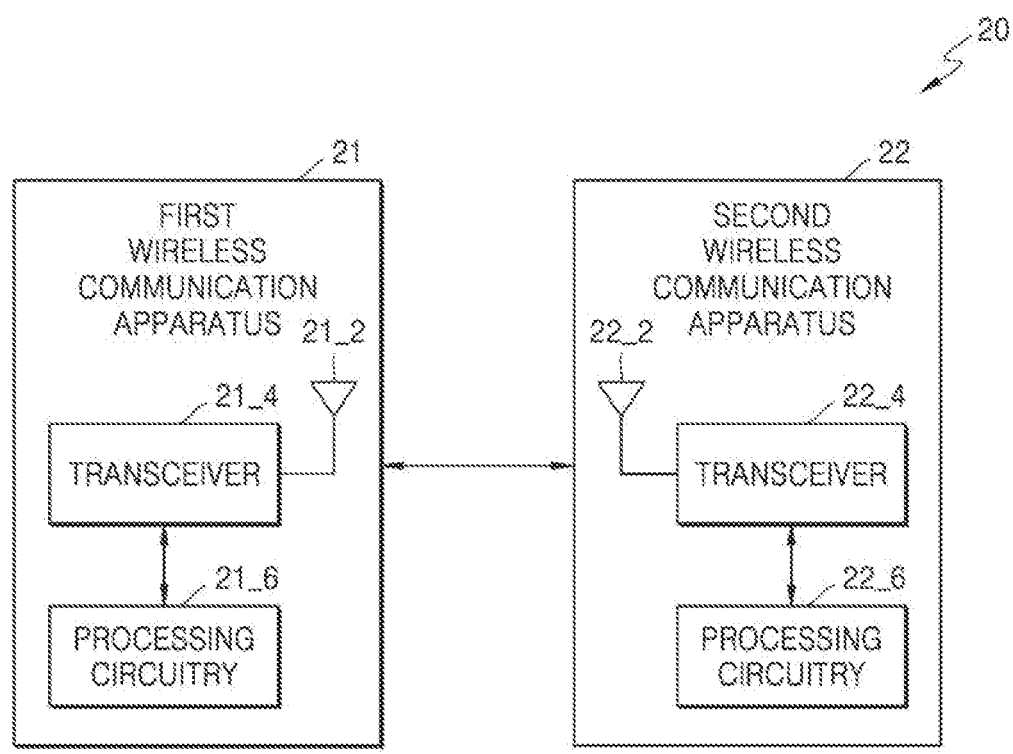
FIG. 2 is a block diagram showing a wireless communication system according to an embodiment.

FIG. 2 is a block diagram showing a wireless communication system 20 according to an embodiment. In detail, FIG. 2 shows a first wireless communication apparatus 21 and a second wireless communication apparatus 22 that communicate with each other in the wireless communication system 20. Each of the first wireless communication apparatus 21 and the second wireless communication apparatus 22 of FIG. 2 may be any device that performs communication in the wireless communication system 20 and may be referred to as a device for wireless communication or simply referred to as a device. In some embodiments, each of the first wireless communication apparatus 21 and the second wireless communication apparatus 22 may be an access point or a station of a WLAN system.

Referring to FIG. 2, the first wireless communication apparatus 21 may include an antenna 21_2, a transceiver 21_4, and processing circuitry 21_6. In some embodiments, the antenna 21_2, the transceiver 21_4, and the processing circuitry 21_6 may be included in one package or may be included in different packages, respectively. Similar to the first wireless communication apparatus 21, the second wireless communication apparatus 22 may include an antenna 22_2, a transceiver 22_4, and processing circuitry 22_6. The first and second wireless communication apparatuses 21 and 22 function similarly and thus hereinafter, redundant descriptions of the first wireless communication apparatus 21 and the second wireless communication apparatus 22 will be omitted for conciseness.

The antenna 21_2 may receive a signal from the second wireless communication apparatus 22 and provide the signal to the transceiver 21_4 and may also transmit a signal provided from the transceiver 21_4 to the second wireless communication apparatus 22. In some embodiments, the antenna 21_2 may include a plurality of antennas for multiple input multiple output (MIMO). Also, in some embodiments, the antenna 21_2 may include a phased array for beam forming.

The transceiver 21_4 may process a signal received from the second wireless communication apparatus 22 through the antenna 21_2 and may provide a processed signal to the processing circuitry 21_6. Also, the transceiver 21_4 may process a signal provided from the processing circuitry 21_6 and may output a processed signal through the antenna 21_2. In some embodiments, the transceiver 21_4 may include analog circuitry, for example, a low noise amplifier, a mixer, a filter, a power amplifier, and/or an oscillator. In some embodiments, the transceiver 21_4 may process a signal received from the antenna 21_2 and/or a signal received from the processing circuitry 21_6 based on the control of the processing circuitry 21_6.

The processing circuitry 21_6 may extract information transmitted by the second wireless communication apparatus 22 by processing a signal received from the transceiver 21_4. For example, the processing circuitry 21_6 may extract information by demodulating and/or decoding a signal received from the transceiver 21_4. Also, the processing circuitry 21_6 may generate a signal including information to be transmitted to the second wireless communication apparatus 22 and provide the signal to the transceiver 21_4. For example, the processing circuitry 21_6 may provide a signal generated by encoding and/or modulating data to be transmitted to the second wireless communication apparatus 22 to the transceiver 21_4. In some embodiments, the processing circuitry 21_6 may include a programmable component such as, for example, a central processing unit (CPU) and/or a digital signal processor (DSP), a reconfigurable component such as, for example, a field programmable gate array (FPGA), or a component that provides a fixed function such as, for example, an intellectual property (IP) core. In some embodiments, the processing circuitry 21_6 may include or access a memory that stores data and/or a series of instructions.

Herein, in the description that follows, the transceiver 21_4 and/or the processing circuitry 21_6 performing operations may be referred to as the first wireless communication apparatus 21 performing the corresponding operations for simplicity. Therefore, operations performed by an access point may be performed by a transceiver and/or a processing circuitry included in the access point, and operations performed by a station may be performed by a transceiver and/or a processing circuitry included in the station.

Figure 3:
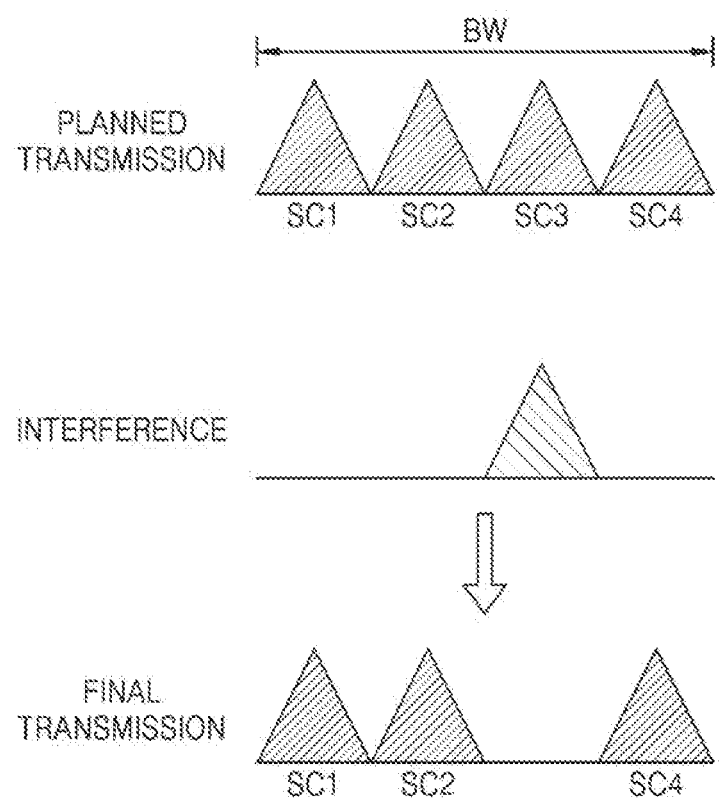
FIG. 3 is a diagram showing an example of sub-channel puncturing according to an embodiment.

FIG. 3 is a diagram showing an example of sub-channel puncturing according to an embodiment; In some embodiments, the sub-channel puncturing of FIG. 3 may be performed by the first access point AP1 and the first station STA1 of FIG. 1 by way of example. Hereinafter, FIG. 3 will be described with reference to FIG. 1. Herein, sub-channel puncturing may be simply referred to as puncturing.

The first access point AP1 and the first station STA1 may communicate with each other over a plurality of sub-channels in a bandwidth. For example, as shown in "Planned Transmission" in FIG. 3, a bandwidth BW may include a first sub-channel SC1, a second sub-channel SC2, a third sub-channel SC3, and a fourth sub-channel SC4, and the first access point AP1 and the first station STA1 may communicate with each other over the first to fourth sub-channels SC1 to SC4. In some embodiments, the sub-channel may have a fixed width, e.g., 20 MHz. In some embodiments, a sub-channel may be defined according to a bandwidth. For example, a sub-channel may have a width of 40 MHz in a 320 MHz bandwidth and may have a width of 20 MHz in other bandwidths.

As shown in FIG. 3, interference may occur in a band corresponding to a third sub-channel SC3. As the number of sub-channels increases, an amount of transmitted information may increase. However, as shown in FIG. 3, when a signal is transmitted over a sub-channel in which interference occurs, a receiving side may fail to receive the signal over the corresponding sub-channel. To prevent this interference and resulting failure to receive the signal over the corresponding sub-channel, a transmitting side may identify a sub-channel in which interference may occur and may not use the identified sub-channel. For example, the first access point AP1 may identify the third sub-channel SC3 in which interference may occur, and, as shown in "Final Transmission" in FIG. 3, may transmit a signal to the first station STA1 over sub-channels in the bandwidth BW other than the third sub-channel SC3, that is, a first sub-channel SC1, a second sub-channel SC2, and a fourth sub-channel SC4. Herein, a sub-channel not used for transmission like the third sub-channel SC3 of FIG. 3 may be referred to as a punctured sub-channel.

To perform puncturing, a transmitting side and a receiving side may share puncturing information. For example, the first access point AP1 may notify the first station STA1 that the third sub-channel SC3 from among the first to fourth sub-channels SC1 to SC4 in the bandwidth BW will not be used, and/or may notify the first station STA1 that the first sub-channel SC1, the second sub-channel SC2, and the fourth sub-channel SC4 in the bandwidth BW will be used. In some embodiments, the first access point AP1 may inform puncturing information to stations in a basic service set (BSS) (e.g., STA1 to STA4 of FIG. 1) in advance. For example, the first access point AP1 may inform puncturing information to stations through a disabled sub-channel bitmap (DSB) field included in a management frame. As described above, a method of communicating over a bandwidth having at least one punctured sub-channel based on previously notified puncturing information may be referred to as static puncturing.

In some embodiments, the first access point AP1 may puncture at least one sub-channel in addition to a sub-channel punctured through static puncturing. For example, when interference occurs on the fourth sub-channel SC4 in a state that the third sub-channel SC3 is punctured through static puncturing as shown in FIG. 3, the first access point AP1 may additionally puncture the fourth sub-channel SC4. As described above, a method of sharing puncturing information according to circumstances and communicating within a bandwidth including at least one additional punctured sub-channel may be referred to as additional puncturing. As described below with reference to FIGS. 7A and 7B, additional puncturing may enable dynamic puncturing and may increase transmission efficiency.

Figure 4:
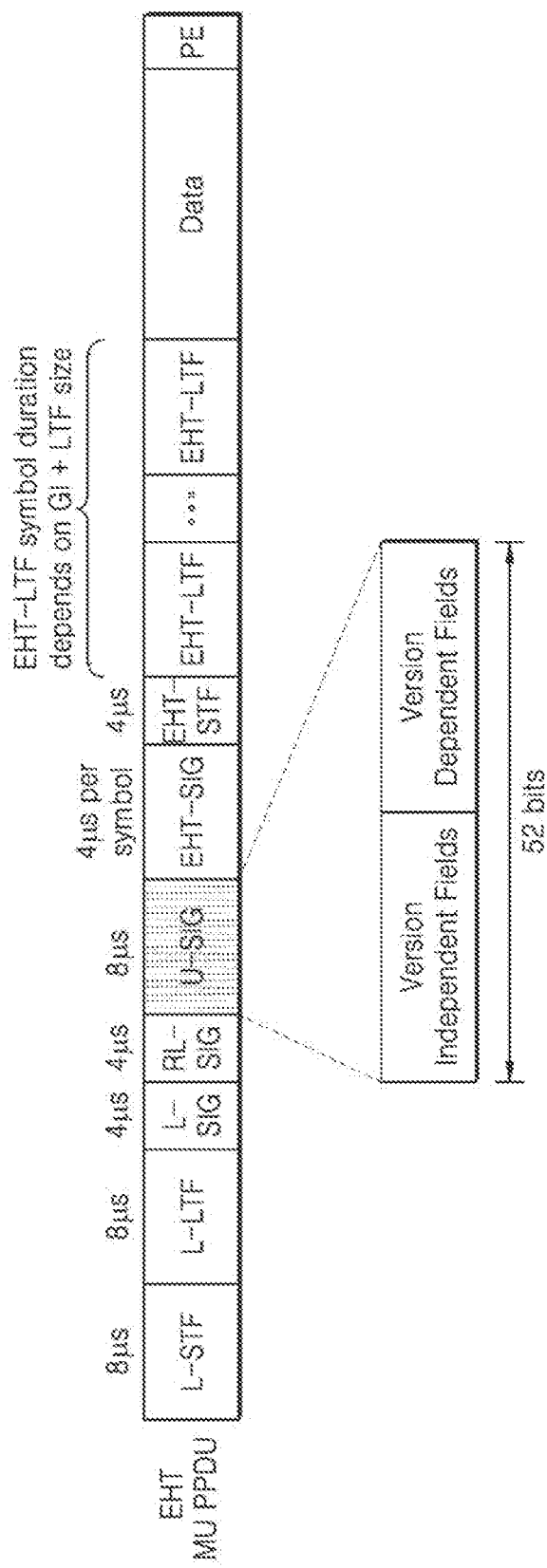
FIG. 4 is a diagram showing a physical layer protocol data unit (PPDU) according to an embodiment.

FIG. 4 is a diagram showing a physical layer protocol data unit (PPDU) according to embodiments. In detail, FIG. 4 shows the structure of an EHT multi-user (MU) PPDU. The HE may define the HE MU PPDU and the HE single user (SU) PPDU. Meanwhile, the EHT may not define the EHT SU PPDU, and the EHT MU PPDU may be transmitted to a single user. The EHT MU PPDU may be set to a compressed mode or a non-compressed mode and may include OFDM symbols in the non-compressed mode. In some embodiments, information regarding additional puncturing may be included in the PPDU.

Referring to FIG. 4, the EHT MU PPDU may include a preamble, which includes training fields and signaling fields, and a payload, which includes a data field. In the preamble, the EHT MU PPDU may include a legacy-short training field (L-STF), a legacy-long training field (L-LTF), a legacy-signal (L-SIG) field, a repeated legacy-signal (RL-SIG) field, a universal signal (U-SIG) field, an extremely high throughput-signal (EHT-SIG) field, an extremely high throughput-short training field (EHT-STF), and an extremely high throughput-long training field (EHT-LTF). Also, in the payload, the EHT MU PPDU may include a Data field and a packet extension (PE) field. Herein, the U-SIG field and the EHT-SIG field may simply be referred to as U-SIG and EHT-SIG, respectively.

The L-STF may include a short training OFDM symbol and may be used for frame detection, automatic gain control (AGC), diversity detection, and coarse frequency/time synchronization. The L-LTF may include a long training OFDM symbol and may be used for fine frequency/time synchronization and channel estimation. The L-SIG field may be used for transmission of control information and may include information regarding a data rate and data length. In some embodiments, the L-SIG field may be repeated in the RL-SIG field.

The U-SIG field (or U-SIG) may include control information common to at least one station receiving the EHT MU PPDU and may correspond to the HE-SIG-A of the HE. For example, as shown in FIG. 4, the U-SIG field may include version-independent fields and version-dependent fields. In some embodiments, the U-SIG field may further include fields respectively corresponding to a cyclic redundancy check (CRC) and a tail and reserved bits. Version-independent fields may have static locations and bit definitions in different generations and/or physical versions. In some embodiments, the U-SIG field may be modulated based on a single modulation scheme, e.g., binary phase-shift keying (BPSK), unlike an EHT-SIG field described below. An example of the U-SIG field will be described later with reference to FIG. 5.

The EHT-SIG field may have a variable modulation and coding scheme (MCS) and a variable length and may correspond to the HE-SIG-B of the HE. For example, when an EHT MU PPDU is transmitted to multiple users, the EHT-SIG field may include a common field including common control information and a user specific field including user-dependent control information, as shown in FIG. 4. As shown in FIG. 4, the U-SIG field may have a fixed length (e.g., 52 bits), whereas the EHT-SIG field may have a variable length. The common field may include U-SIG overflow, the total number of non-OFDMA users, and resource unit (RU) allocation (RUA) subfield. User specific fields for non-MU MIMO may include a station identifier (STA-ID) subfield, an MCS subfield, a number of spatial streams (NSTS) subfield, a Beam-formed subfield, and a coding subfield, whereas user specific fields for MU-MIMO may include an STA-ID subfield, an MCS subfield, a coding subfield, and a spatial configuration subfield. In some embodiments, the EHT-SIG field may be modulated based on one of two or more modulation schemes like the BPSK, quadrature binary phase shift keying (QBPSK), etc.

Figure 5:
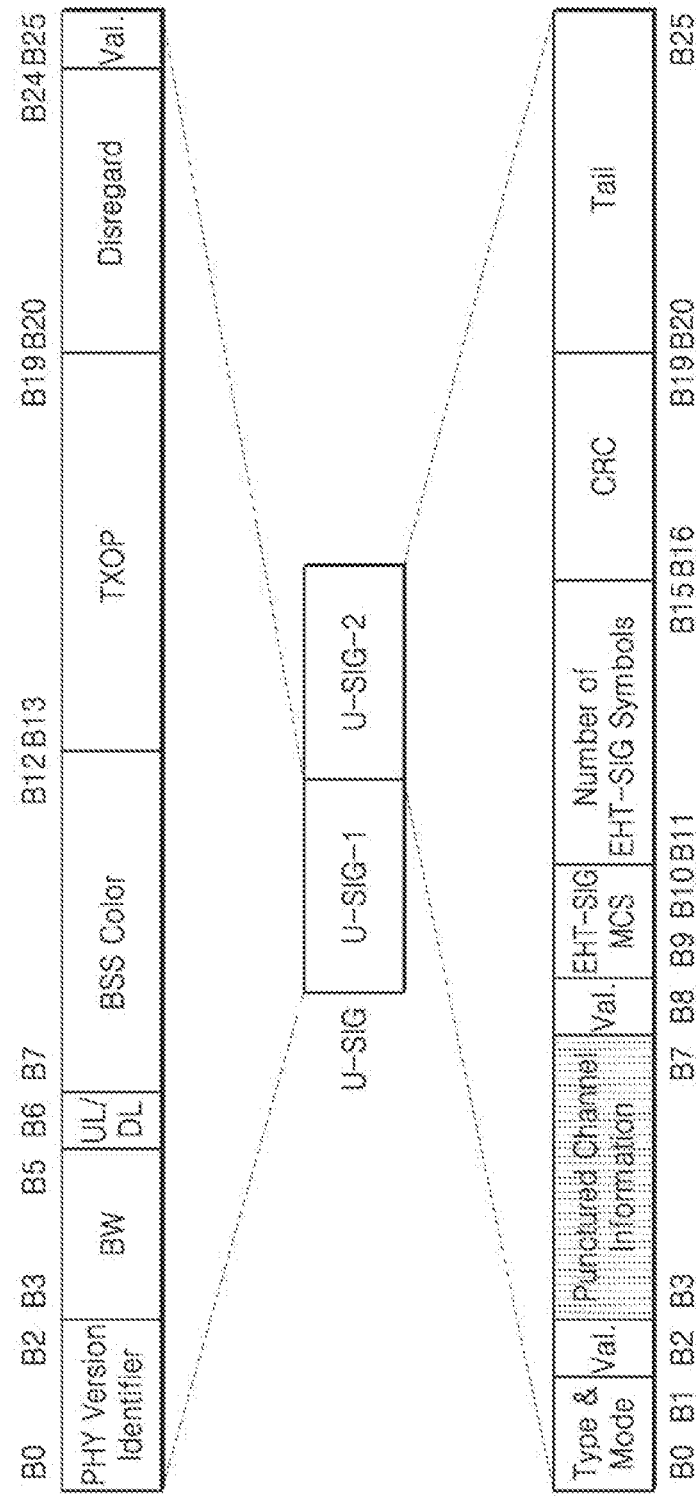
FIG. 5 is a diagram showing a universal signal (U-SIG) field according to an embodiment.

FIG. 5 is a diagram showing a U-SIG field according to an embodiment, and FIG. 6 is a diagram showing a punctured channel information field according to an embodiment. As described above with reference to FIG. 4, the U-SIG field may be included in the EHT MU PPDU, and the EHT-SIG field may follow the U-SIG field. In some embodiments, information regarding additional puncturing may be included in the U-SIG field.

Referring to FIG. 5, the U-SIG field may include U-SIG-1 and U-SIG-2. The U-SIG-1 and the U-SIG-2 may correspond to two symbols, respectively, and may each have a length of 26 bits, as shown in FIG. 5. The U-SIG-1 may include version-independent fields, that is, a physical (PHY) version identifier field (3 bits), a bandwidth (BW) field (3 bits), an uplink/downlink (UL/DL) field (1 bit), a basic service set (BSS) color field (6 bits), and a transmit opportunity (TXOP) field (7 bits). Also, the U-SIG-2 may include version-dependent fields, that is, a PPDU type and compression mode (Type & Mode) field (2 bits), a punctured channel information field (5 bits), a validate (Val.) field, an EHT-SIG MCS field (2 bits), and a number of EHT-SIG symbols field (5 bits). The U-SIG-2 may further include a cyclic redundancy check (CRC) field and a tail field.

Referring to FIG. 6, the punctured channel information field from among fields included in the U-SIG-2 may have a value indicating a puncturing pattern in a bandwidth. As shown in FIG. 6, the punctured channel information field may have a length of 5 bits (e.g., B3-B7) and may have a value indicating one of puncturing patterns defined in advance. For example, when the secondary 20 MHz is punctured according to the DSB field of the management frame in the 80 MHz bandwidth, an access point may transmit a PPDU including the punctured channel information field having a value indicating one of patterns in which the secondary 20 MHz is punctured. Herein, a PPDU transmitted over a bandwidth including at least one punctured sub-channel may be referred to as a punctured PPDU.

An access point or a station transmitting a punctured PPDU, which is punctured through additional puncturing, may designate a RU or an MRU by which a station or an access point receiving the punctured PPDU will respond. However, while an access point is capable of designating a RU or an MRU by using a trigger frame, a station is unable to use the trigger frame. Also, a particular method of designating a RU or an MRU through a trigger frame may be advantageous. Therefore, signaling for additional puncturing may be used.

Figure 7A:
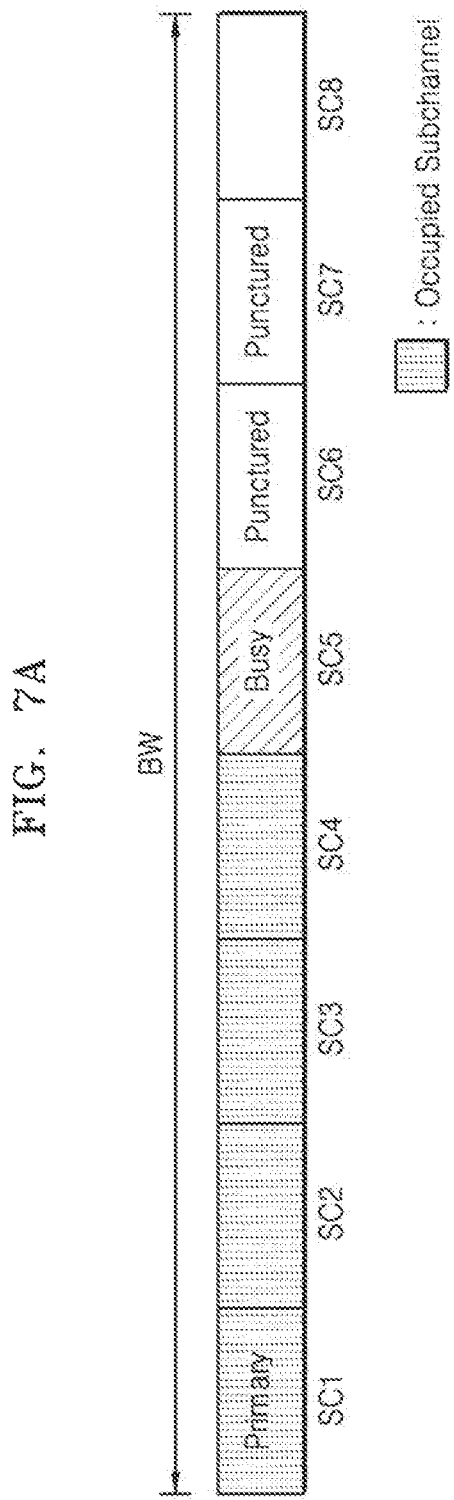

FIGS. 7A and 7B are diagrams showing examples of puncturing according to embodiments; In detail, FIG. 7A shows an example of static puncturing, and FIG. 7B shows an example of additional puncturing. In some embodiments, the examples of puncturing of FIGS. 7A and 7B may be performed by the first access point AP1 and the first station STA1 of FIG. 1 by way of example. Hereinafter, FIGS. 7A and 7B will be described with reference to FIG. 1.

Referring to FIGS. 7A and 7B, the first access point AP1 and the first station STA1 may communicate with each other based on static puncturing. For example, the first access point AP1 and the first station STA1 may communicate with each other within a bandwidth BW (e.g., 160 MHz), and the bandwidth BW may include a first sub-channel SC1, a second sub-channel SC2, a third sub-channel SC3, a fourth sub-sub-channel SC4, a fifth sub-channel SC5, a sixth sub-channel SC6, a seventh sub-channel SC7, and an eighth sub-channel SC8. Through static puncturing, a sixth sub-channel SC6 and a seventh sub-channel SC7 from among the first to eighth sub-channels SC1 to SC8 may be punctured. In some embodiments, as described above with reference to FIG. 3, information regarding the punctured sixth sub-channel SC6 and the punctured seventh sub-channel SC7 may be provided to the first station STA1 through the DSB field of the management frame.

The first station STA1 may detect that a fifth sub-channel SC5 is in a busy state, that is, being used by another wireless communication device through clear channel assessment (CCA). When only static puncturing is used, that is, when the first station STA1 has no means to inform puncturing of the fifth sub-channel SC5 to the first access point AP1, as shown in FIG. 7A, the first station STA1 may transmit signals over a sub-band having the bandwidth BW including a primary sub-channel (i.e., the first sub-channel SC1) and the second to fourth sub-channels SC2 to SC4, that is, the first to fourth sub-channels SC1 to SC4, and thus an eighth sub-channel SC8 may not be used. On the other hand, when additional puncturing is used, as shown in FIG. 7B, the first station STA1 may inform puncturing of the fifth sub-channel SC5 to the first access point AP1, and thus only fifth to seventh sub-channels SC5 to SC7 may be punctured. As a result, the eighth sub-channel SC8 may be used as well as the first to fourth sub-channels SC1 to SC4, and thus a higher throughput may be achieved.

Figure 8:
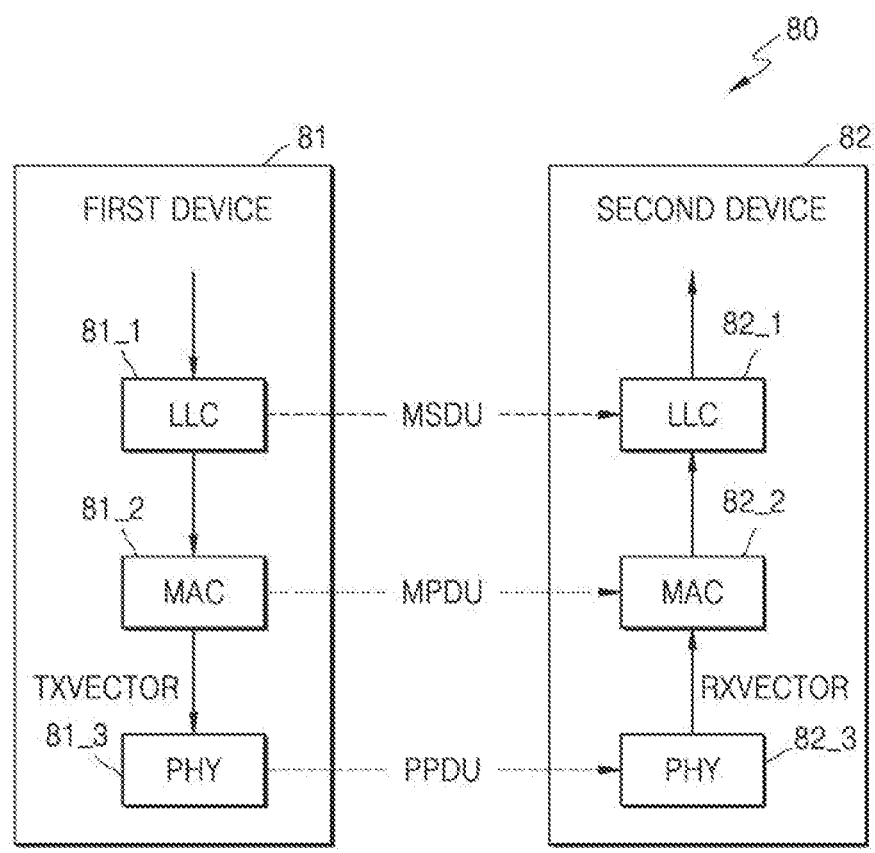
FIG. 8 is a block diagram showing a wireless communication system according to an embodiment.

FIG. 8 is a block diagram showing a wireless communication system 80 according to an embodiment. In detail, FIG. 8 shows a first device 81 and a second device 82 that communicate with each other in the wireless communication system 80. In some embodiments, each of the first device 81 and the second device 82 may be an access point or a station of a WLAN system.

Referring to FIG. 8, each of the first device 81 and the second device 82 may implement a protocol stack of the wireless communication system 80. For example, as shown in FIG. 8, the first device 81 may include entities respectively implementing a logical link control (LLC) layer 81_1, a media access control (MAC) layer 81_2, and a physical (PHY) layer 81_3. Also, the second device 82 may include entities respectively implementing an LLC layer 82_1, an MAC layer 82_2, and a PHY layer 82_3 respectively. An LLC layer and an MAC layer may be included in a data-link layer and may be referred to as an LLC sub-layer and a MAC sub-layer, respectively. Also, a PHY layer may include a physical layer convergence procedure (PLCP) sub-layer and a physical layer medium dependent (PMD) sub-layer.

The LLC layer 81_1 of the first device 81 and the LLC layer 82_1 of the second device 82 may exchange a MAC service data unit (MSDU). The MAC layer 81_2 of the first device 81 and the MAC layer 82_2 of the second device 82 may exchange a MAC protocol data unit (MPDU). For example, the LLC layer 81_1 of the first device 81 may provide an MSDU to the MAC layer 81_2, and the MAC layer 81_2 may generate the MPDU including the MSDU. Also, the MAC layer 82_2 of the second device 82 may generate an MSDU from the MPDU and provide the MSDU to the LLC layer 82_1. The PHY layer 81_3 of the first device 81 and the PHY layer 82_3 of the second device 82 may exchange a physical layer protocol data unit (PPDU). For example, the MAC layer 81_2 of the first device 81 may provide a physical layer service data unit (PSDU) to the PHY layer 81_3, and the PHY layer 81_3 may generate the PPDU including the PSDU. Also, the PHY layer 82_3 of the second device 82 may generate a PSDU from the PPDU and provide the PSDU to the MAC layer 82_2.

As shown in FIG. 8, the MAC layer 81_2 of the first device 81 may provide a TXVECTOR to the PHY layer 81_3. For example, the MAC layer 81_2 may provide the TXVECTOR, which includes control information for generating and transmitting a PPDU and control information for the second device 82 to receive and interpret the PPDU, to the PHY layer 81_3. The TXVECTOR may include a plurality of parameters, and the PHY layer 81_3 may generate a PPDU including a PSDU based on values of the parameters included in the TXVECTOR.

The PHY layer 82_3 of the second device 82 may provide an RXVECTOR to the MAC layer 82_2. For example, the PHY layer 82_3 may obtain information for processing a PPDU based on a PLCP preamble and a PLCP header extracted from the PPDU and provide the RXVECTOR including the obtained information to the MAC layer 82_2. The RXVECTOR may include a plurality of parameters, and the MAC layer 82_2 may generate an MPDU from a PSDU based on values of the parameters included in the RXVECTOR.

As described above with reference to FIGS. 4 to 6, a PPDU may include a field including puncturing information, that is, a punctured channel information field. The MAC layer 81_2 of the first device 81 may provide a TXVECTOR including a parameter indicating puncturing information (e.g., INACTIVE SUBCHANNEL of FIG. 16A) to the PHY layer 81_3, and the PHY layer 81_3 may generate a PPDU including the punctured channel information field based on the parameter of the TXVECTOR. The PHY layer 82_3 of the second device 82 may extract the punctured channel information field from the PPDU and may identify the puncturing information from the value of the punctured channel information field. However, unlike the TXVECTOR, an RXVECTOR provided by the physical layer 82_3 to the MAC layer 82_2 may not include a parameter indicating puncturing information, and thus it may not be possible to implement additional puncturing due to the MAC layer 82_2 that is unable to identify the puncturing information.

Hereinafter, examples of signaling of puncturing information for additional puncturing will be described with reference to the drawings. A transmitting side may provide information for additional puncturing to a receiving side, and the receiving side may process a signal received from the transmitting side by identifying the information for additional puncturing. Also, the receiving side may transmit a signal to the transmitting side based on the information for additional puncturing. Herein, examples in which a first device provides information for additional puncturing to a second device will be described. The information for additional puncturing may be provided by an access point to a station or by a station to an access point (or another station). In other words, each of the first device and the second device may be an access point or a station.

FIG. 9 is a message diagram showing a wireless communication method based on puncturing according to an embodiment. As shown in FIG. 9, the wireless communication method based on puncturing may include a plurality of operations S91 to S98.

Referring to FIG. 9, in operation S91, a first device 91 may determine at least one sub-channel to be punctured. For example, the first device 91 may determine at least one sub-channel to be punctured in a bandwidth in addition to a sub-channel punctured through static puncturing within the bandwidth. In some embodiments, the first device 91 may detect at least one sub-channel in a busy state through CCA and select the detected at least one sub-channel as a puncturing target.

In operation S92, the first device 91 may generate a first field. For example, the first device 91 may generate the first field based on the at least one sub-channel determined in operation S91. The first field may include a plurality of bits, and the bits may have a value indicating information regarding at least one sub-channel. In some embodiments, the first field may have a value indicating a punctured sub-channel, like the punctured channel information field of FIG. 6. For example, the first field may include 5 bits like the punctured channel information of FIG. 6, or the first field may include 16 bits respectively corresponding to 16 20 MHz sub-channels in a 320 MHz bandwidth. In some embodiments, the first field may have a value indicating a RU/MRU corresponding to a sub-channel that is not punctured, like a RU/MRU allocation field. For example, the first field may include 9 bits like the RU/MRU allocation field of a trigger frame.

In operation S93, the first device 91 may generate a MAC frame. For example, the first device 91 may generate a MAC frame including the first field generated in operation S92. Examples of a MAC frame including the first field will be described later with reference to FIGS. 10A, 10B, and 11.

In operation S94, the first device 91 may transmit a first PPDU, and the second device 92 may receive the first PPDU. For example, the first device 91 may transmit the first PPDU punctured in the at least one sub-channel determined in operation S91 to the second device 92. The first PPDU may include the MAC frame generated in operation S93, and the MAC frame may include the first field generated in operation S92.

In operation S95, the second device 92 may extract the MAC frame. For example, the second device 92 may extract the MAC frame from the first PPDU punctured in the at least one sub-channel within the bandwidth. In operation S96, the second device 92 may extract the first field. For example, the second device 92 may extract the first field from the MAC frame extracted in operation S95. In operation S97, the second device 92 may identify the at least one sub-channel to be punctured. For example, the second device 92 may identify the at least one sub-channel to be punctured within the bandwidth based on the value of the first field extracted in operation S96.

In operation S98, the second device 92 may transmit a second PPDU, and the first device 91 may receive the second PPDU. For example, the second device 92 may transmit the second PPDU punctured in the at least one sub-channel identified in operation S97 to the first device 91. As a result, both the first PPDU and the second PPDU may be punctured through additional puncturing, and thus higher transmission efficiency may be achieved, as described above with reference to FIG. 7B.

Figure 10A:
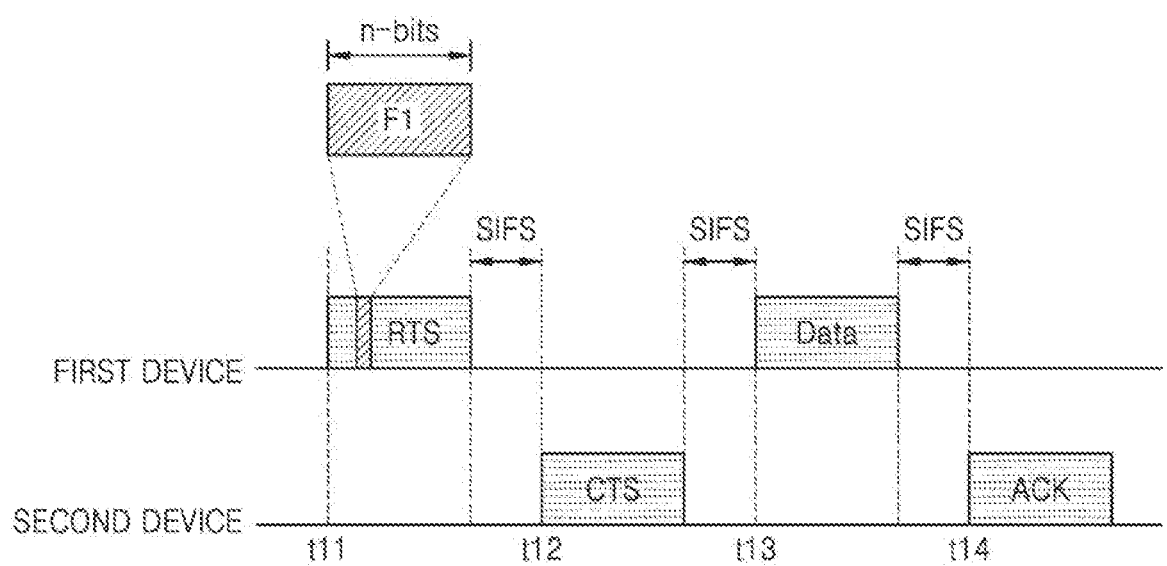
FIGS. 10A and 10B are timing diagrams showing examples of a first field according to embodiments.
Figure 10B:
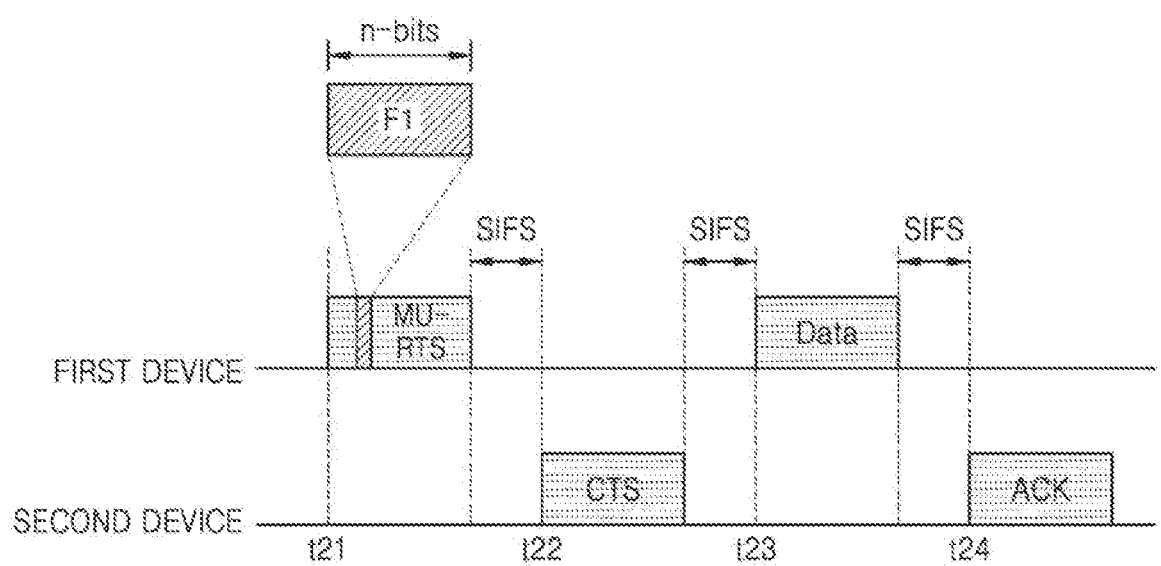

FIGS. 10A and 10B are timing diagrams showing examples of a first field according to embodiments. In detail, the timing diagrams of FIGS. 10A and 10B show examples of a first field F1 included in a control frame as an example of a MAC frame. As described above with reference to FIG. 9, the first field F1 may include information regarding additional puncturing and may be included in the control frame. A request to send (RTS) frame and a multi-user (MU)-RTS frame of FIGS. 10A and 10B are merely examples of the control frame, and in some embodiments, the first field F1 may be included in other control frames.

Referring to FIG. 10A, the first field F1 may be included in the RTS frame as an example of a control frame. For example, as shown in FIG. 10A, starting at a time point t11, the first device may transmit the RTS frame to the second device. The RTS frame may include the first field F1 indicating at least one punctured sub-channel, and the first field F1 may include n-bits (n is an integer greater than 1).

After transmission of the RTS frame is completed and a short inter-frame space (SIFS) is elapsed, the second device may transmit a clear to send (CTS) frame to the first device starting at a time point t12. For example, the second device may identify at least one punctured sub-channel within a bandwidth based on the value of the first field F1 included in the RTS frame and transmit the CTS frame to the first device over sub-channels that are not punctured.

After the transmission of the CTS frame is completed and the SIFS is elapsed, the first device may transmit Data (or a data frame) to the second device starting at a time point t13. For example, the first device may transmit a PPDU, which is punctured in at least one sub-channel indicated by the value of the first field F1 included in the RTS frame, to the second device.

After the transmission of data is completed and the SIFS is elapsed, the second device may transmit an acknowledgment (ACK) frame to the first device starting at a time point t14. For example, the second device may identify at least one punctured sub-channel within a bandwidth based on the value of the first field F1 included in the RTS frame and transmit the ACK frame to the first device over sub-channels that are not punctured.

Referring to FIG. 10B, the first field F1 may be included in the MU-RTS frame as an example of a control frame. For example, as shown in FIG. 10B, starting at a time point t21, the first device may transmit the MU-RTS frame to the second device. The MU-RTS frame may have a structure for allocating RUs and/or MRUs to a plurality of devices (e.g., a plurality of stations) to receive CTS frames from the devices, like a trigger frame. Therefore, the MU-RTS frame may be used to transmit information regarding additional puncturing, and, as shown in FIG. 10B, the MU-RTS frame may include the first field F1 indicating at least one punctured sub-channel, wherein the first field F1 may include n-bits (n is an integer greater than 1).

After the transmission of the MU-RTS frame is completed and the SIFS is elapsed, the second device may transmit the CTS frame to the first device starting at a time point t22. For example, the second device may identify at least one punctured sub-channel within a bandwidth based on the value of the first field F1 included in the MU-RTS frame and transmit the CTS frame to the first device over sub-channels that are not punctured.

After the transmission of the CTS frame is completed and the SIFS is elapsed, the first device may transmit Data (or a data frame) to the second device starting at a time point t23. For example, the first device may transmit a PPDU, which is punctured in at least one sub-channel indicated by the value of the first field F1 included in the MU-RTS frame, to the second device.

After the transmission of data is completed and SIFS is elapsed, starting at a time point t24, the second device may transmit the ACK frame to the first device. For example, the second device may identify at least one punctured sub-channel within a bandwidth based on the value of the first field F1 included in the MU-RTS frame and transmit the ACK frame to the first device over sub-channels that are not punctured.

Figure 11:
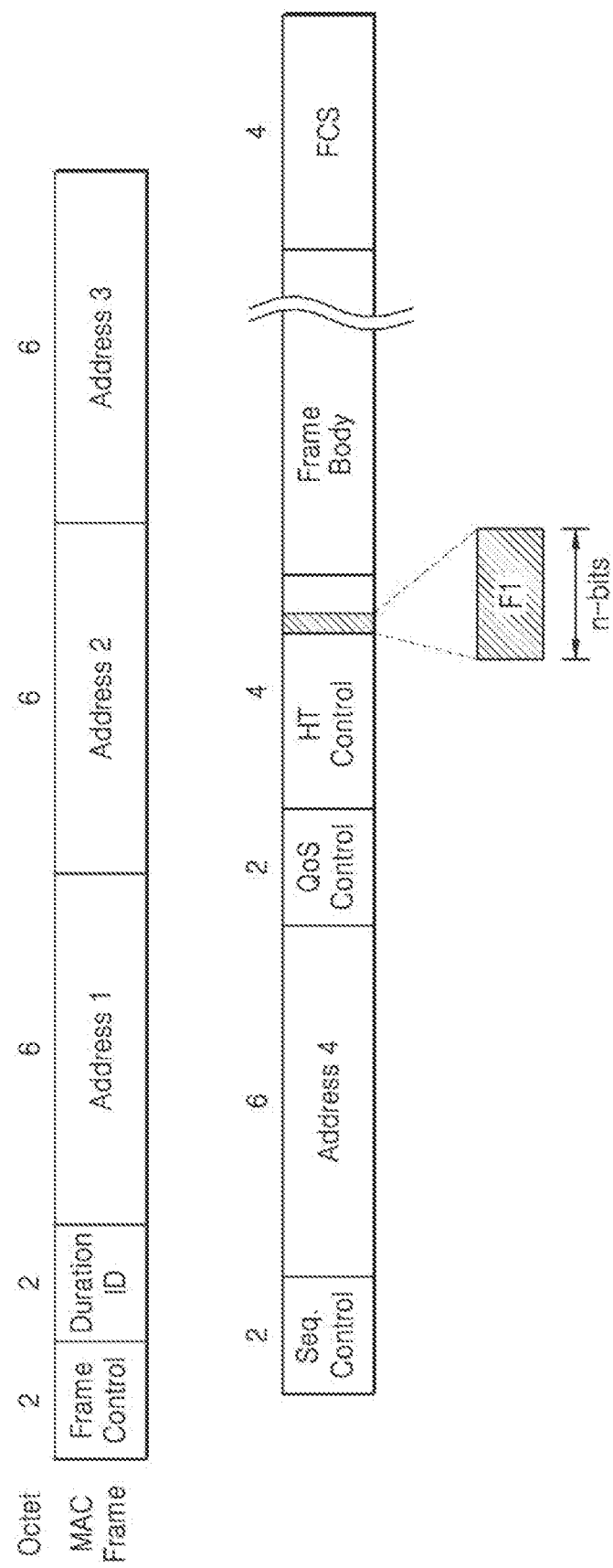
FIG. 11 is a diagram showing an example of a first field according to an embodiment.

FIG. 11 is a diagram showing an example of a first field according to an embodiment. In detail, FIG. 11 shows an example of the first field F1 included in a management frame or a data frame as an example of a MAC frame. As described above with reference to FIG. 9, the first field F1 may include information regarding additional puncturing and may be included in the MAC frame.

Referring to FIG. 11, the MAC frame may include a frame control field (2 bytes), a duration identifier (ID) field (2 bytes), an address 1 field (6 bytes), an address 2 field (6 bytes), an address 3 field (6 bytes), a sequence (Seq.) control field (2 bytes), an address 4 field (6 bytes), a quality-of-service (QoS) control field (2 bytes), a high throughput (HT) control field (4 bytes), a frame body and frame check sequence (FCS)) field (4 bytes). In some embodiments, the address 4 field (6 bytes) may be omitted in the MAC frame. The frame control field, the duration ID field, the address 1 field, the address 2 field, the address 3 field, the sequence control field, the address 4 field, the QoS control field, and the HT control field may be referred to as a MAC header.

In some embodiments, the first field F1 may be included in the HT control field. For example, the first field F1 may be included in an aggregated (A)-control subfield of a HT variant HT control field. When the first device includes an A-MPDU in a punctured PPDU and transmits the punctured PPDU, the first device may include the first field F1, that is, the A-control subfield, in the A-MPDU. Upon receiving the punctured PPDU, the second device may identify at least one punctured sub-channel from the A-control subfield and transmit a punctured BA frame to the first device based on the identified at least one sub-channel. Examples in which the first field F1 is included in the A-control subfield will be described below with reference to FIGS. 12A and 12B.

Figure 12A:
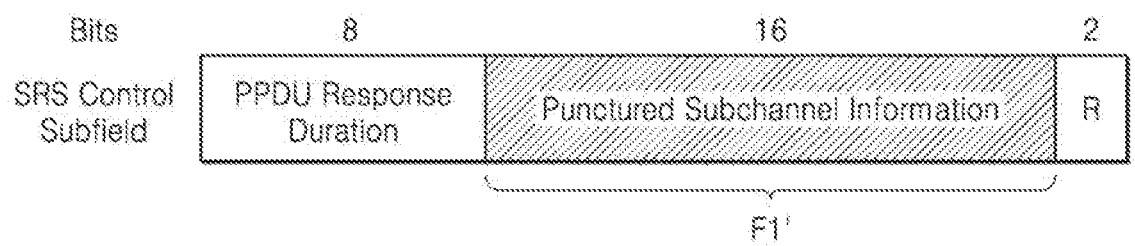
FIGS. 12A and 12B are diagrams showing examples of a first field according to embodiments.
Figure 12B:
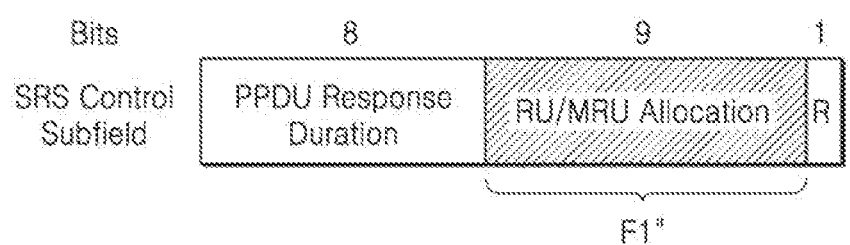

FIGS. 12A and 12B are diagrams showing examples of a first field according to various embodiments. In detail, FIGS. 12A and 12B show examples of the first field F1 included in a single response scheduling (SRS) control subfield as an example of the A-control subfield. The SRS control subfield of FIGS. 12A and 12B is merely an example of the A-control subfield, and in some embodiments, the first field F1 may be included in other A-control subfields of the HT control field. For example, the first field F1 may be included in the existing A-control subfield, e.g., a triggered response scheduling (TRS) control subfield, or may be included in a new A-control subfield.

Referring to FIG. 12A, in non-OFDMA transmission, the SRS control subfield may include a PPDU response duration field (8 bits), a punctured sub-channel information field F1' (16 bits), and reserved bits (R) (2 bits). In some embodiments, each bit of the punctured sub-channel information field F1' may indicate whether one sub-channel is punctured. For example, each bit of the punctured sub-channel information field F1' may indicate whether the 20 MHz band is punctured, and thus the punctured sub-channel information field F1' may indicate whether each of 16 sub-channels is punctured in the maximum 320 MHz bandwidth. The punctured sub-channel information field F1' in FIG. 12A is merely an example, and, for example, in some embodiments, the SRS control subfield may include a punctured sub-channel information field having a length shorter than 16 bits (e.g., 5 bits of FIG. 6) or a RU/MRU allocation field, which will be described below with reference to FIG. 12B.

Referring to FIG. 12B, in OFDMA transmission, the SRS control subfield may include the PPDU response duration field (8 bits), a RU/MRU allocation field F1" (9 bits), and a reserved bit (1 bit). In some embodiments, the RU/MRU allocation field F1" may have the same format as an RU/MRU allocation field included in the trigger frame and may show the pattern of RU/MRU used for transmission. A RU and/or a MRU allocated by the RU/MRU allocation field F1" may correspond to sub-channels that are not punctured, thereby indirectly indicating at least one punctured sub-channel. In FIG. 12B, the RU/MRU allocation field F1" is merely an example, and, for example, in some embodiments, the SRS control subfield may include a 5-bit punctured channel information field corresponding to the punctured channel information field of FIG. 6.

Figure 13:
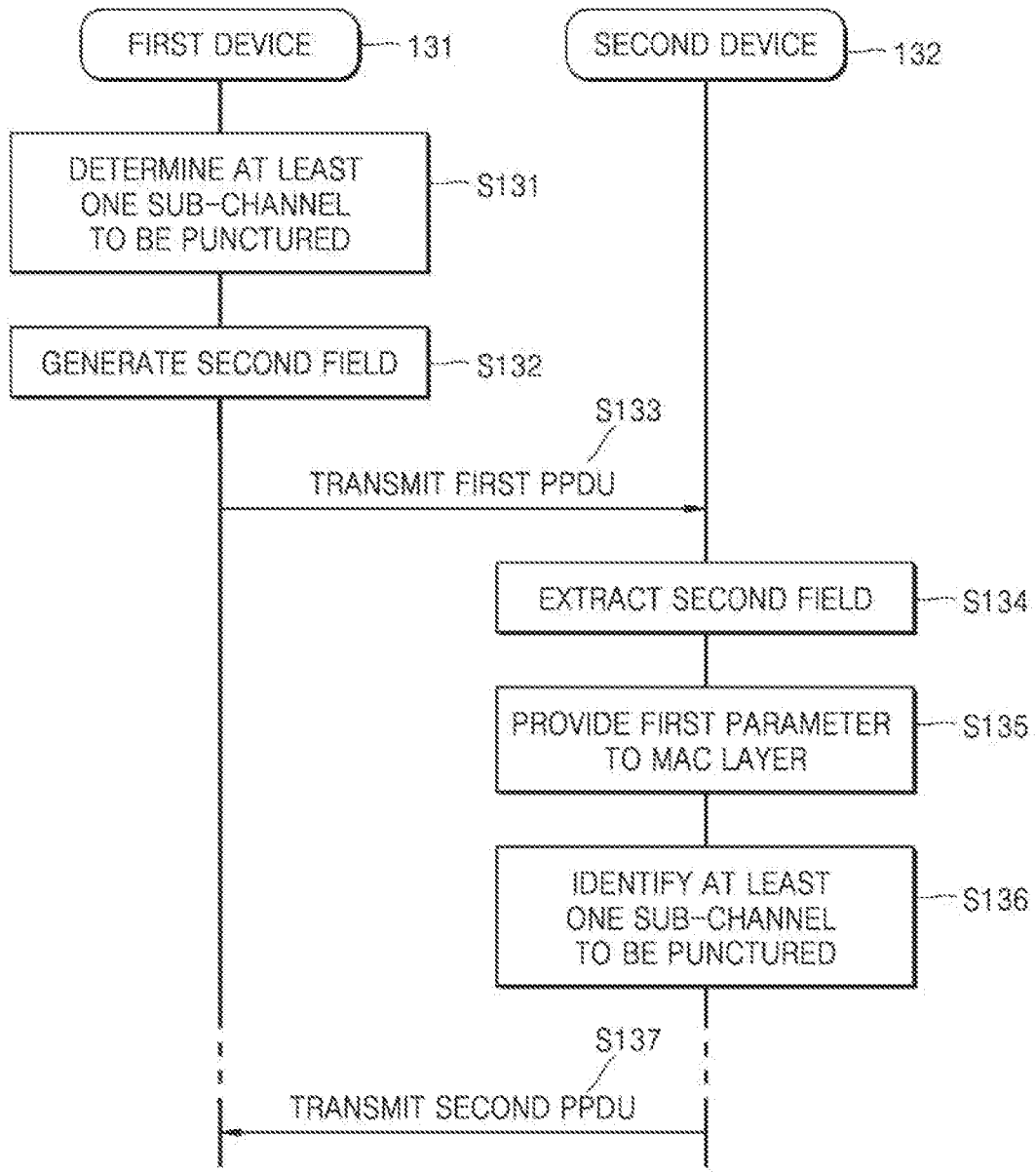
FIG. 13 is a message diagram showing a wireless communication method based on puncturing according to an embodiment.

FIG. 13 is a message diagram showing a wireless communication method based on puncturing according to an embodiment. As shown in FIG. 13, the wireless communication method based on puncturing may include a plurality of operations S131 to S137.

Referring to FIG. 13, in operation S131, a first device 131 may determine at least one sub-channel to be punctured. For example, the first device 131 may determine at least one sub-channel to be punctured in addition to a sub-channel punctured through static puncturing within a bandwidth. In some embodiments, the first device 131 may detect at least one sub-channel in a busy state through CCA and select the detected at least one sub-channel as a puncturing target.

In operation S132, the first device 131 may generate a second field. For example, the first device 131 may generate the second field based on the at least one sub-channel determined in operation S131. The second field may include a plurality of bits, and the bits may have a value indicating information regarding at least one sub-channel. In some embodiments, the second field may have a value indicating a punctured sub-channel, like the punctured channel information field of FIG. 6. For example, the second field may include 5 bits like the punctured channel information of FIG. 6, or the second field may include 16 bits respectively corresponding to 16 20 MHz sub-channels in a 320 MHz bandwidth. In some embodiments, the second field may have a value indicating a RU/MRU corresponding to a sub-channel that is not punctured, like a RU/MRU allocation field. For example, the second field may include 9 bits like the RU/MRU allocation field of a trigger frame.

In operation S133, the first device 131 may transmit a first PPDU, and the second device 132 may receive the first PPDU. For example, the first device 131 may transmit the first PPDU punctured in the at least one sub-channel determined in operation S131 to the second device 132. The first PPDU may include the second field generated in operation S132. As described above with reference to FIGS. 4 to 6, an MU PPDU may include a punctured channel information field in the U-SIG-2 field, and the second field may correspond to the punctured channel information field. However, a non-HT duplicate PPDU may not include the punctured channel information field, and thus the non-HT duplicate PPDU may include a newly defined second field. Examples of the second field included in the non-HT duplicate PPDU will be described later with reference to FIGS. 15A to 15D.

In operation S134, the second device 132 may extract the second field. For example, a PHY layer implemented in the second device 132 (e.g., 82_3 of FIG. 8) may extract the second field from a first PPDU punctured in the at least one sub-channel within the bandwidth.

In operation S135, the second device 132 may provide a first parameter to a MAC layer. For example, the PHY layer (e.g., 82_3 of FIG. 8) of the second device 132 may transmit an RXVECTOR including the first parameter to the MAC layer (e.g., 82_2 of FIG. 8), based on the value of the second field extracted in operation S134. The RXVECTOR may include a first parameter indicating puncturing information, and examples of the first parameter will be described later with reference to FIGS. 16A to 16C.

In operation S136, the second device 132 may identify the at least one punctured sub-channel. For example, the MAC layer of the second device 92 (e.g., 82_2 of FIG. 8) may identify the at least one sub-channel punctured within the bandwidth based on the value of the first parameter provided in operation S135.

In operation S137, the second device 132 may transmit a second PPDU, and the first device 131 may receive the second PPDU. For example, the second device 132 may transmit the second PPDU punctured in the at least one sub-channel identified in operation S136 to the first device 131. As a result, both the first PPDU and the second PPDU may be punctured through additional puncturing, and thus higher transmission efficiency may be achieved, as described above with reference to FIG. 7B.

FIG. 14 is a diagram showing a service field according to an embodiment. In some embodiments, the second field described with respect to FIG. 13 may be included in the service field of a non-HT duplicate PPDU.

Referring to FIG. 14, the service field may include 16 bits. A condition "A" may refer to cases other than a condition "B", and the condition "B" may refer to a case in which CH_BANDWIDTH_IN_NOT_HT is present, dot11EHTOptionImplemented is true, and a station is STA 6G supporting the 320 MHz bandwidth. The lower 7 bits B0 to B6 of the service field may correspond to scrambler initialization. As shown in FIG. 14, a sixth bit B5 and a seventh bit B6 of the lower 7 bits of the service field may correspond to CH_BANDWIDTH_IN_NOT_HT of a TXVECTOR during transmission and may correspond to CH_BANDWIDTH_IN_NOT_HT_INDICATOR of an RXVECTOR during reception. For example, the sixth bit B5 and the seventh bit B6 of the service field may indicate one bandwidth from among 20 MHz, 40 MHz, 80 MHz, and 160 MHz. An eighth bit B7 of the service field may correspond to the 3rd bit of CH_BANDWIDTH_IN_NOT_HT CBINH during transmission and may correspond to the 3rd bit of CH_BANDWIDTH_IN_NOT_HT_INDICATOR CBINHI during reception, under the condition "B". For example, the eighth bit B7 of the service field may be "1" in the 320 Mz bandwidth and may be "0" in other bandwidths. As shown in FIG. 14, the service field may include upper 8 bits that are reserved (indicated by "R" in FIG. 14), and the second field of FIG. 13 may include at least one bit from among the upper 8 bits of the service field. Examples of the second field included in the second field will be described later with reference to FIGS. 15A to 15D.

FIGS. 15A to 15D are diagrams showing examples of a second field according to various embodiments. As described above with reference to FIG. 14, the second field may be included in the service field of the non-HT duplicate PPDU and may include at least one reserved bit of the service field. The second fields shown in FIGS. 15A to 15D are merely examples, and in some embodiments, a second field of any format may be included in the service field.

Referring to FIG. 15A, in some embodiments, a second field F2 may include 4 bits (e.g., B8 to B11) from among reserved upper 8 bits of the service field. As described above with reference to FIG. 14, in the 320 MHz bandwidth, the eighth bit B7 of the service field may be used, and the sixth bit B5 and the seventh bit B6 of the service field may not be used. At least 5 bits may be needed to indicate a puncturing pattern in the 320 MHz bandwidth, whereas up to 4 bits may be needed to indicate a puncturing pattern in a bandwidth less than 320 MHz. Accordingly, the sixth bit B5 and the seventh bit B6 of the service field that are not used in the 320 MHz bandwidth may be used as parts of the second field F2, and, as shown in FIG. 15A, 5 bits B5, B6, B8, B9, and B10 of the service field may be used for puncturing information in the 320 MHz bandwidth. Also, as shown in FIG. 15A, when the bandwidth is less than 320 MHz (e.g., 40 MHz, 80 MHz, or 160 MHz), the bandwidth may be identified by the sixth bit B5 and the seventh bit B6 of the service field, and 4 bits B8, B9, B10, and B11 may be used as the second field F2.

Referring to FIG. 15B, in some embodiments, the second field F2 may include 5 bits (e.g., B8 to B12) from among reserved upper 8 bits of the service field. For example, like the punctured channel information field having the length of 5 bits described above with reference to FIG. 6, 5 bits of the reserved upper 8 bits of the service field may be used as the second field. As shown in FIG. 15B, in the case of non-OFDMA, CH_BANDWIDTH_IN_NON_HT, that is, the sixth bit B5 and the seventh bit B6 of the service field may be included in the second field F2, and the 5 bits B8 to B12 of the service field may be included in the second field F2. Also, in the case of OFDMA, the 5 bits B8 to B12 of the service field may be used to indicate RU/MRU allocation.

Figure 15C:
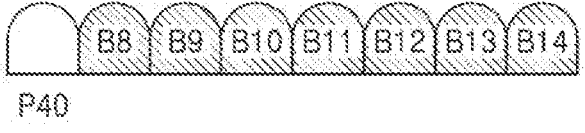

Referring to FIG. 15C, in some embodiments, each bit of the second field F2 may correspond to one sub-channel. For example, in the embodiment illustrated in FIG. 15C, a primary sub-channel may not be punctured in a bandwidth, and thus the second field F2 may include 7 bits (e.g., B8 to B14) respectively corresponding to 7 sub-channels. As shown in FIG. 15C, when the bandwidth is 320 MHz, each bit of the 7 bits B8 to B14 may correspond to 40 MHz, and the 7 bits B8 to B14 may indicate whether 7 sub-channels except for primary 40 MHz P40 are punctured. Also, when the bandwidth is less than 320 MHz, each bit of the 7 bits B8 to B14 may correspond to 20 MHz, and the 7 bits B8 to B14 may indicate whether 7 sub-channels except for primary 20 MHz P20 are punctured.

Figure 15D:
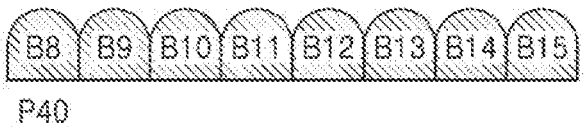

Referring to FIG. 15D, in some embodiments, each bit of the second field F2 may correspond to one sub-channel. As compared with the example of FIG. 15C, in the example of FIG. 15D, the second field F2 may additionally indicate whether a primary sub-channel is punctured, and thus the second field F2 may include 8 bits (E.g., B8 to B15) respectively corresponding to 8 sub-channels. As shown in FIG. 15D, when the bandwidth is 320 MHz, each bit of the 8 bits B8 to B15 may correspond to 40 MHz and may respectively indicate whether 8 sub-channels are punctured. Also, when the bandwidth is less than 320 MHz, each bit of the 8 bits B8 to B15 may correspond to 20 MHz and may respectively indicate whether 8 sub-channels are punctured.

FIGS. 16A to 16C are diagrams showing examples of parameters according to various embodiments. In detail, FIGS. 16A to 16C show examples of the first parameter of FIG. 13 indicating puncturing information. As described above with reference to FIG. 8, a MAC layer of a first device may provide a TXVECTOR to a PHY layer, and the PHY layer of a second device may provide an RXVECTOR to the MAC layer. As described above with reference to FIG. 13, the PHY layer of the second device may provide the first parameter to the MAC layer based on the value of a second field extracted from a PPDU, and the RXVECTOR may include the first parameter.

Referring to FIG. 16A, the RXVECTOR may include INACTIVE_SUBCHANNELS. When the first device transmits a punctured PPDU, the MAC layer of the first device may provide information regarding a punctured sub-channel to the PHY layer through INACTIVE_SUBCHANNELS, which is a parameter included in the TXVECTOR. Similarly, the second device may receive the punctured PPDU. The PHY layer of the second device may obtain information regarding a punctured sub-channel (e.g., the second field in FIG. 13) from the punctured PPDU and may provide the RXVECTOR including INACTIVE_SUBCHANNELS to the MAC layer based on obtained information.

Referring to FIG. 16B, RU_ALLOCATION included in the RXVECTOR may be used to indicate puncturing information. A RU/MRU may be allocated to a sub-channel that is not punctured within a bandwidth, and thus, as described above with reference to the drawings, information regarding allocation of RU/MRU may indirectly indicate a punctured sub-channel. The PHY layer of the second device may provide an RXVECTOR including RU_ALLOCATION to the MAC layer based on puncturing information obtained from a punctured PPDU.

Referring to FIG. 16C, the RXVECTOR may include PUNCTURED_CHANNEL. As shown in FIG. 16C, PUNCTURED_CHANNEL may not be included in a TXVECTOR and may be added to the RXVECTOR. The PHY layer of the second device may provide the RXVECTOR including PUNCTURED_CHANNEL to the MAC layer based on the puncturing information obtained from the punctured PPDU. PUNCTURED_CHANNEL of FIG. 16C is merely an example, and in some embodiments, the first parameter added to RXVECTOR may have any name.

Figure 17:
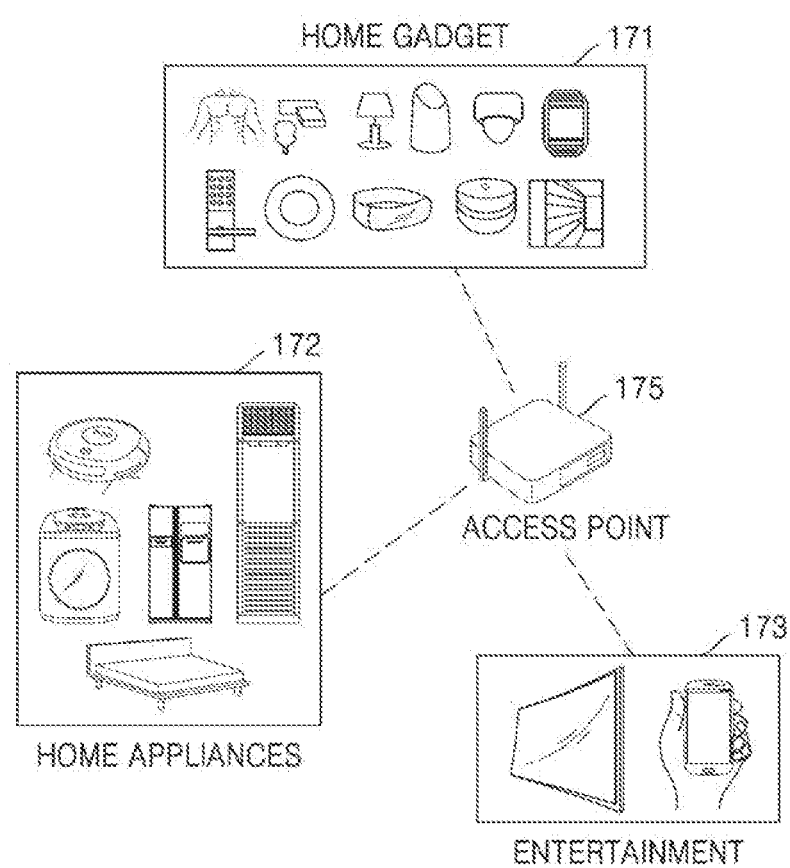
FIG. 17 is a diagram showing examples of devices for wireless communication according to embodiments.

FIG. 17 is a diagram showing examples of devices for wireless communication according to various embodiments. In detail, FIG. 17 shows an Internet of Things (IoT) network system including a home gadget 171, a home appliance 172, an entertainment device 173, and an access point 175.

In some embodiments, in the devices for wireless communication of FIG. 17, as described above with reference to the drawings, additional puncturing may be supported as well as static puncturing. Therefore, the devices for wireless communication may communicate with one another by effectively excluding a sub-channel in a busy state. Therefore, the throughput may be increased, and the efficiency of a WLAN system may be increased.

While various embodiments have been particularly shown and described above, it will be understood that various changes in form and details may be made therein without departing from the spirit and scope of the following claims.

What is claimed is:

1. A wireless communication method comprising:
   determining, by a first device, at least one sub-channel to be punctured within a bandwidth;
   generating, by the first device, a first field based on the at least one sub-channel;
   generating, by the first device, a media access control (MAC) frame comprising the first field; and
   transmitting, by the first device, a first physical layer protocol data unit (PPDU) punctured in the at least one sub-channel within the bandwidth, to a second device,
   wherein the first field has a value indicating a resource unit allocated in a sub-channel that is not punctured within the bandwidth, and
   wherein the first field has a length of 9-bits.

2. The wireless communication method of claim 1, wherein the MAC frame is a control frame.

3. The wireless communication method of claim 2, wherein the MAC frame is a request to send (RTS) or a multi-user-RTS (MU-RTS) frame.

4. The wireless communication method of claim 1, wherein the MAC frame is a management frame or a data frame, and
   the first field is included in an aggregated (A)-control subfield of a high throughput (HT) control field.

5. The wireless communication method of claim 4, wherein the A-control subfield is a signal response scheduling (SRS) control subfield.

6. The wireless communication method of claim 1, wherein the first field has a value indicating the at least one sub-channel within the bandwidth.

7. The wireless communication method of claim 1, further comprising receiving, by the first device, a second PPDU punctured in the at least one sub-channel within the bandwidth, from the second device.

8. A wireless communication method comprising:
   determining, by a first device, at least one sub-channel to be punctured within a bandwidth;
   generating, by the first device, a first field based on the at least one sub-channel; and
   transmitting, by the first device, a non-high throughput (HT) duplicate physical layer protocol data unit (PPDU) comprising the first field and punctured in the at least one sub-channel within the bandwidth, to a second device,
   wherein the first field is included in a service field and comprises at least one bit from among upper 8-bits of the service field,
   wherein the first field comprises at least 7-bits from among the upper 8-bits of the service field.

9. The wireless communication method of claim 8, wherein the first field comprises CH_BANDWIDTH_IN_NON_HT and at least 4-bits of the upper 8-bits of the service field.

10. A wireless communication method comprising:
- receiving, by a second device, a first physical layer protocol data unit (PPDU) punctured in at least one sub-channel within a bandwidth, from a first device, the first PPDU including a first field based on the at least one sub-channel within the bandwidth;
- extracting, by the second device in a physical (PHY) layer, the first field from the first PPDU and providing a RXVECTOR to a media access control (MAC) layer of the second device, the RXVECTOR including a first parameter based on the first field that indicates the at least one sub-channel that is punctured within the bandwidth; and
- identifying, by the second device in the MAC layer, the at least one sub-channel within the bandwidth, based on a value of the first parameter.

11. The wireless communication method of claim 10, wherein the first parameter has a same format as an INACTIVE SUBCHANNEL of a TXVECTOR.

12. The wireless communication method of claim 10, wherein the first parameter is RU_ALLOCATION of the RXVECTOR.

13. The wireless communication method of claim 10, wherein the first PPDU is a multi-user (MU)-PPDU, and
the first field is a punctured channel information field.

14. The wireless communication method of claim 10, wherein the first PPDU is a non-high throughput (HT) duplicate PPDU, and
the first field is included in a service field and comprises at least one bit from among upper 8-bits of the service field.

15. The wireless communication method of claim 14, wherein the first field comprises CH_BANDWIDTH_IN_NON_HT and at least 4-bits of the upper 8-bits of the service field.

16. The wireless communication method of claim 14, wherein the first field comprises at least 7-bits from among the upper 8-bits of the service field.

* * * * *